June 13, 1950          R. E. SCHULZ          2,511,741
DIFFERENTIAL LOCKING DRIVING CHUCK
Filed June 20, 1947          2 Sheets-Sheet 1
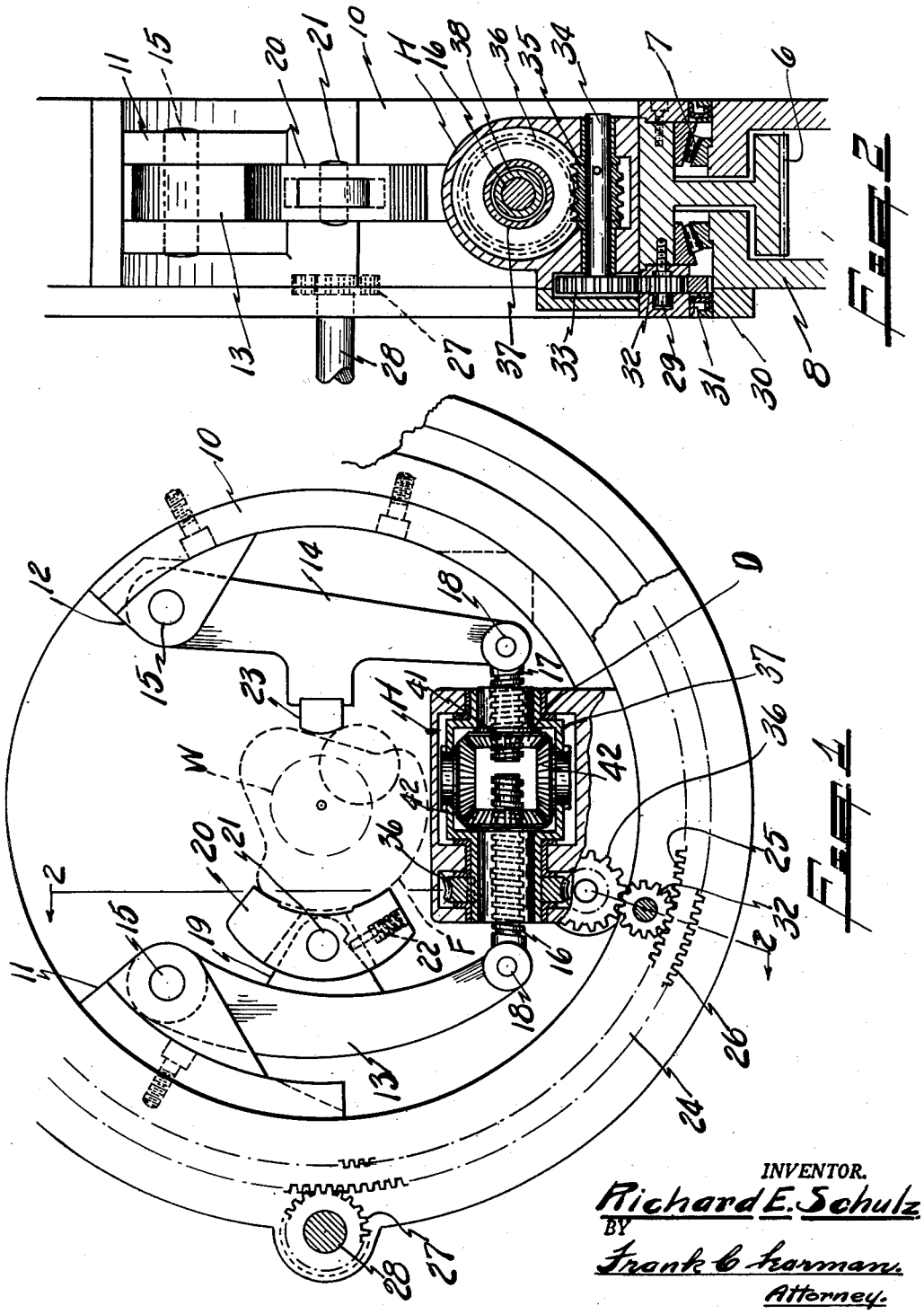
INVENTOR.
*Richard E. Schulz*
BY *Frank C. Korman.*
Attorney.

June 13, 1950 R. E. SCHULZ 2,511,741
DIFFERENTIAL LOCKING DRIVING CHUCK
Filed June 20, 1947 2 Sheets-Sheet 2
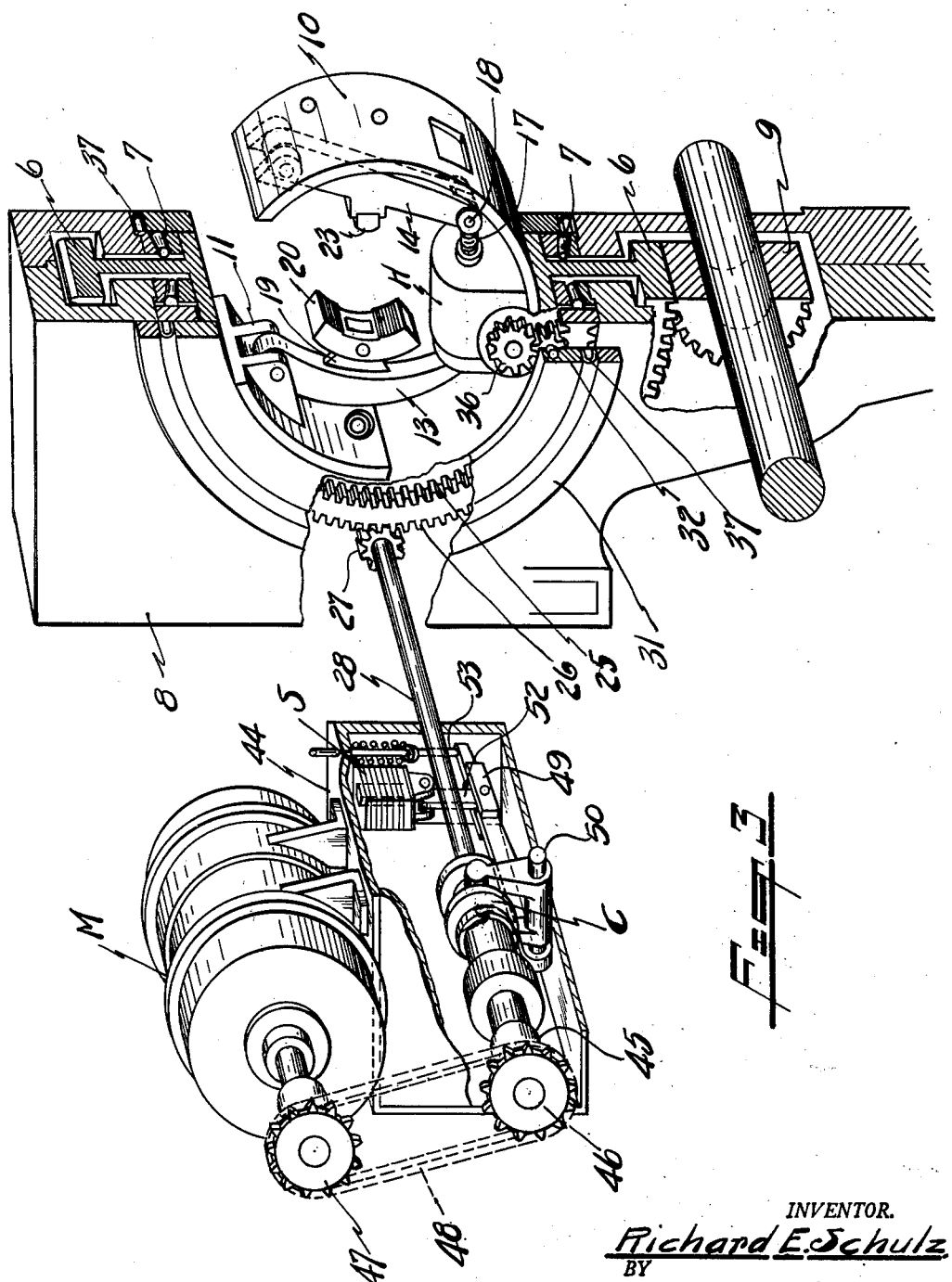
INVENTOR.
Richard E. Schulz
BY
Frank C. Forman
Attorney.

Patented June 13, 1950

2,511,741

UNITED STATES PATENT OFFICE 2,511,741

DIFFERENTIAL LOCKING DRIVING CHUCK

Richard E. Schulz, Saginaw, Mich., assignor to Wickes Bros., Saginaw, Mich.

Application June 20, 1947, Serial No. 756,028

5 Claims. (Cl. 82—40)

This invention relates to power-operated driving chucks for lathes, and more particularly to a center-drive chuck for center-drive crankshaft lathes.

The operation of a power chucking device on a rotating work spindle is quite difficult where the work spindle constitutes a ring gear of a center-drive lathe. In such an arrangement where the chucking device is mounted inside the ring gear, considerable difficulty is experienced in properly applying power to this rotating ring gear, because the side faces of the center gear must be clear and free of any mechanism or apparatus for applying power to the chucking device, as this would otherwise interfere with the cutting tools etc. of the lathe.

Therefore, one of the prime objects of the invention is to design a simple, power-actuated mechanism and arrangement whereby power may be applied to the chucking device of a center drive lathe for locking and unlocking the jaws of a driving chuck without interference with the cutting tools of the lathe.

Another object is to design a driving chuck in which the clamping jaws are actuated by differential gearing to compensate for roughness, variation, or any inaccuracy in the workpiece.

A further object is to design a chuck locking means that exerts an even pressure on the workpiece, eliminating any side thrust on the crankshaft centers, or distortion in the workpiece, so that the machining will be accurate and true.

A further object still is to provide a power-actuated chuck which requires no wrenches or manual effort to operate, but which can be manually actuated if desired or required.

Still a further object is to provide simple, practical and effective means for actuating and energizing the chuck jaws so that the workpiece may be firmly gripped and held in true axial alignment in the lathe.

To the accomplishment of the foregoing and related ends, said invention consists in the means hereinafter fully described and particularly pointed out in the claims, the annexed drawings and following description setting forth in detail, certain means and one mode of carrying out the invention, such disclosed means and mode illustrating, however, but one of various ways in which the principle of the invention may be used.

In the drawings:

Fig. 1 is an axial view of a center drive ring gear of a center drive lathe showing a power-operated chucking device incorporating the main features of the instant invention.

Fig. 2 is a transverse, sectional view taken on the line 2—2 of Fig. 1.

Fig. 3 is a sectional, perspective view, parts being broken away to show the relationship of the various parts.

The present invention relates to power-operated chucks such as used for gripping and clamping a workpiece in a lathe, and comprises a center-drive ring gear 6 mounted on bearings 7 which are interposed between the frame 8 and the ring gear of the lathe, said ring gear being driven by means of a drive pinion 9 in the conventional manner.

The chucking device 10 is mounted in this ring gear 6 and includes an inner housing H in which a differential gear assembly D is mounted. Lugs 11 and 12 respectively are mounted in the chuck as shown, and arms 13 and 14 are pivotally secured to these lugs by means of pins 15, the lower ends of the individual arms being hingedly connected to screws 16 and 17 by means of pins 18, and these screws are actuated in a manner to be presently described.

An inwardly projecting lug 19 is provided intermediate the length of the arm 13 and a floating jaw 20 is rockably secured thereto by means of the pin 21, said jaw being suitably recessed to accommodate the lug, and a spring-pressed pin 22 is provided in the edge of the jaw for holding it in proper position to engage the web F of a workpiece W as it is placed in position in the chuck.

The opposite arm 14 is formed substantially similar to the arm 13 except that a land 23 is provided thereon and engages the opposite edge of the web of the workpiece W when the members are in locked position.

An internal and externally toothed ring gear 24 is secured to the one edge of the chuck in any approved manner, the inner face being toothed as at 25, and the outer face being toothed as at 26 to form an external ring gear, said gear being driven by means of a spur pinion 27 mounted on a shaft 28, and meshing with the external teeth 26 of said gear.

A flange 29 is secured to the edge of the center-drive ring gear 6, and another flange 30 is secured to the side of the frame 8, an oil seal 31 being interposed between the members 29 and 30 to provide a leak-proof joint thereat.

An idler 32 is mounted on the ring gear and flange 6 and 29 respectively, said idler meshing with and being driven by the toothed section 25 of the ring gear 24, and also being in mesh with and driving a spur gear 33 which is mounted on the shaft 34 which also carries a worm 35, this worm driving the worm wheel 36 which is mounted in the housing H.

The differential gear assembly D is mounted in the inner housing H and is formed as clearly shown in Figs. 1 and 2 of the drawings; it comprises a cage 37 in which internally threaded hubs 38 and 39 of the miter gears 40 and 41 are mounted, the worm wheel 36 being mounted on the hubs 38.

Miter gears 42 and 43 are mounted in the cage 37 in toothed engagement with the gears 40 and 41, and the screws 16 and 17 have threaded engagement in said hubs, so that when the worm wheel is driven to actuate the differential gear arrangement, the screws 16 and 17 will force the arms towards or away from each other to lock or unlock the workpiece in the chuck.

The ring gear 24 is driven by the pinion 27 which is mounted on the shaft 28 and forms a part of the locking means, said shaft extending into a housing 44, and a clutch member C is interposed intermediate the length of said shaft, the end of the shaft being journaled in a bearing 45 provided in the housing, and a sprocket 46 is provided thereon. Any desired means can be utilized for operating the locking mechanism; it can be either electric, hydraulic, or pneumatic power, and in the present instance I have shown it as electrically operated, a motor M being provided as shown, and is provided with a sprocket 47, drivingly connected to the sprocket 46 by means of a chain 48.

The clutch C is actuated by means of a lever 49 which is pivotally mounted in the housing 44 at the point 50, said lever being formed with offset shifting forks 51 engageable with the clutch, and a solenoid S is mounted in the housing above the lever as shown, a link 52 hingedly connecting the solenoid and lever, and a spring-pressed pin 53 is provided to force the clutch out of engagement when the power is cut off; the control is very simple; it is merely necessary for the workman to engage a remote control (not shown), and which is connected to any suitable source of power.

I wish to direct particular attention to the fact that the arm and jaw actuating mechanism is self-equalizing due to the differential gearing, thus compensating for any roughness or unevenness of crankshaft web.

While in the instant case I have shown threaded hubs in which the screws 16 and 17 are mounted, I wish it clearly understood that this is for the purpose of illustration only, and that any other equivalent means may be used.

From the foregoing description, it will be obvious that by means of this unique arrangement I have provided a very efficient mechanism whereby a chucking means of a center-drive chuck may be power-actuated to materially speed up the locking and unlocking operation, which increases production, and eliminates manual effort on the part of the operator in tightly clamping the work-piece in the chuck.

What I claim is:

1. In a center-drive lathe, a frame, a center-drive ring gear rotatably mounted in said frame, a power-actuated chucking device mounted in said ring gear, work-engaging means provided on the chuck, a differential for actuating said work-engaging means to lock and unlock the work, internally and externally toothed ring gear drivingly connected to the differential, and means exterior of the ring gear and drivingly connected to said internally and externally toothed ring gear for applying power for operating said differential.

2. In a center drive lathe, a frame, a center-drive ring gear rotatably mounted in said frame, a power-operated chuck in said ring gear and including opposed arms provided with work gripping members thereon, self-equalizing means interposed between said arms, and internally and externally toothed ring gear drivingly connected to said self-equalizing means and driving means for applying power to said internally and externally toothed gear for driving said self-equalizing means from a point exterior of said ring gear.

3. The combination set forth in claim 2 in which said driving means comprises a power-driven shaft drivingly connected to the said gear, a clutch interposed intermediate the length of the shaft, and means for automatically shifting said clutch to energize the driving means.

4. The combination as defined in claim 2 in which said driving means includes a source of power, a driven shaft connected to said power means and drivingly connected to said gear, a clutch interposed intermediate the length of said driven shaft, and a solenoid for actuating said clutch.

5. In a center drive lathe, a frame, a center drive ring gear rotatably mounted in said frame, a power-actuated chucking device mounted in said ring gear, a work-engaging means provided on the chuck, a differential for actuating said work-engaging means to lock and unlock the work, an internally and externally toothed ring gear drivingly connected to the differential, a source of power drivingly connected to said ring gear, and an automatically shiftable clutch drivingly connecting said source of power with the ring gear.

RICHARD E. SCHULZ.

REFERENCES CITED

The following references are of record in the file of this patent:

UNITED STATES PATENTS

| Number | Name | Date |
| --- | --- | --- |
| 2,191,137 | Trible | Feb. 20, 1940 |
| 2,215,922 | Groene | Sept. 24, 1940 |
| 2,232,226 | Groene | Feb. 18, 1941 |
| 2,249,240 | Groene | July 15, 1941 |